United States Patent [19]
Gold

[11] Patent Number: 5,798,163
[45] Date of Patent: Aug. 25, 1998

[54] TEMPORARY TARP-LIKE BARRIER ASSEMBLY, KIT AND METHOD THEREFOR

[76] Inventor: Peter N. Gold, 465 N. Wood Rd., Rockville Centre, N.Y. 11570

[21] Appl. No.: 722,421

[22] Filed: Oct. 1, 1996

[51] Int. Cl.⁶ .................................................. B32B 3/06
[52] U.S. Cl. ........................ 428/100; 24/442; 156/260; 156/265; 156/297; 156/298; 297/220; 428/99; 428/131
[58] Field of Search .................. 428/99, 100, 131; 24/442; 297/220; 156/260, 265, 297, 298, 60

[56] References Cited

U.S. PATENT DOCUMENTS

| | | | |
|---|---|---|---|
| 3,063,749 | 11/1962 | Struble | 428/100 |
| 4,216,257 | 8/1980 | Schams | 428/100 |
| 4,359,497 | 11/1982 | Madger | 428/141 |
| 5,611,122 | 3/1997 | Torigoe | 428/100 |

*Primary Examiner*—Nasser Ahmad
*Attorney, Agent, or Firm*—Galgano & Burke

[57] ABSTRACT

A temporary tarp-like barrier assembly which includes a plastic sheet thermally and mechanically fastened to loop-like hangers made from reclosable fasteners. The plastic sheet is sandwiched between engaging portions of the interlocking members of the hanger so that the plastic sheet is supportable from a pole or rod from the loop-like hanger. In addition, disclosed is a kit for providing a temporary tarp-like barrier which includes a plastic sheet and at least one loop-like hanger. The hanger is made from a reclosable fastener having a first portion and a second portion with each respectively having a plurality of interlocking members. The plastic sheet is sandwichable between engaging portions of the interlocking members of the hanger so that the plastic sheet is supportable from the loop-like hanger. Desirably, the plastic sheet is heated prior to attachment to the hanger to the heated sheet so that the plastic sheet deforms to and more permanently attaches to the mechanical interlocking members of the hanger.

11 Claims, 1 Drawing Sheet

TEMPORARY TARP-LIKE BARRIER ASSEMBLY, KIT AND METHOD THEREFOR

BACKGROUND OF THE INVENTION

The present invention relates generally to temporary tarp-like barriers. More particularly, this invention relates to a temporary tarp-like barrier assembly, kit and method for readily providing, constructing and erecting at a worksite a temporary tarp-like barrier which includes a plastic sheet thermally and mechanically fastened to loop-like hangers made from reclosable fasteners.

Plastic sheets have been widely used for temporary barriers. For example, plastic sheets are typically used at construction sites to provide a temporary barrier for providing protective cover from the rain or wind. To hold the plastic in place, adhesive tape is often used to hold the edges of the plastic sheet to a support structure. A drawback with using adhesive tape is that the tape easily peels away from either the plastic sheet or the structure to which the plastic sheet is attached.

An alternative to adhesive tape is to make holes along the edge of the plastic sheet from which hooks, rope or wire can be inserted to attach the plastic sheet to a support. A drawback of providing holes along an edge of a plastic sheet for supporting the plastic sheet is that the plastic sheet adjacent the edge is likely to tear. Another drawback is that making holes along the edge of a plastic sheet and subsequently attaching the hooks, rope or wire, is a time-consuming process.

It would therefore be desirable to provide a temporary tarp-like assembly, kit and method for quickly providing a temporary tarp-like barrier which includes a plastic sheet and thermally and mechanically fastenable loop-like hangers so that the edge of the plastic sheet may be readily supported from the loop-like hangers.

SUMMARY OF THE INVENTION

Accordingly, it is an object of the present invention to provide a novel temporary tarp-like barrier assembly which is readily and facilely supportable at a worksite to provide a protective cover from the rain or wind.

It is another object of the present invention to provide a temporary tarp-like barrier assembly which once held in place is less likely to detach from a support structure compared to using adhesive tape, wire, or string.

It is still another object of the present invention to provide a novel kit and method for readily providing, constructing and erecting at a worksite a temporary tarp-like barrier.

It is a more particular object of the present invention to provide such a kit and method which only requires the provision of a plastic sheet and loop-like hangers made from reclosable fasteners which are thermally and mechanically attachable to the plastic sheet to quickly form a temporary tarp-like barrier.

It is a further object of the present invention to provide a temporary tarp-like barrier assembly and kit which is inexpensive to manufacture, easily compacted for sale, and useable in a wide variety of applications.

Certain of the foregoing and related objects are readily obtained in a temporary tarp-like barrier assembly which comprises a plastic sheet, and at least one loop-like hanger comprising a reclosable fastener having a first portion and a second portion each respectively having a plurality of mechanical interlocking members. A portion of the plastic sheet is sandwiched between engaging portions of the interlocking members of the loop-like hanger so that the plastic sheet is supportable from the loop-like hanger.

Preferably, the hanger comprises a backing from which outwardly extends the mechanical interlocking members, and the mechanical interlocking members comprise a shank with an enlarged end. Desirably, the enlarged end is mushroom-shaped.

Advantageously, the plastic sheet is thermally deformable to the mechanical interlocking members of said hanger and at least a portion of the interlocking members extend through the plastic sheet. Most advantageously, the plastic sheet and the interlocking members are fabricated from compatible thermoplastic material so as to thermally bond to each other.

Certain of the foregoing and related objects are also readily obtained in a kit for providing a temporary tarp-like barrier in which the kit comprises a plastic sheet, and at least one loop-like hanger comprising a reclosable fastener having a first portion and a second portion each respectively having a plurality of mechanical interlocking members. The plastic sheet is sandwichable between engaging portions of the interlocking members of the at least one loop-like hanger to thereby attach the at least one loop-like hanger to the plastic sheet so that the plastic sheet is supportable from the loop-like hanger.

Certain of the foregoing and related objects are further readily obtained in a method for providing a temporary tarp-like barrier which comprises the steps of providing a plastic sheet, providing at least one loop-like hanger comprising a reclosable fastener having a first portion and a second portion each respectively having a plurality of interlocking members, contacting the interlocking members of the first portion of the hanger with a first surface of the sheet, contacting the interlocking members of the second portion of the hanger with an opposite surface of the plastic sheet so that the first and second portions generally overlap each other, and applying a force to the first and second portions of the hanger to sandwich the plastic sheet between the interlocking members of the hanger to attach the hanger to the plastic sheet. Preferably, the method includes the step of heating at least a portion of the plastic sheet to which the at least one hanger is attached.

BRIEF DESCRIPTION OF THE DRAWINGS

Other objects and features of the present invention will become apparent from the detailed description considered in connection with the accompanying drawing, which discloses one embodiment of the present invention. It is to be understood that the drawing is to be used for the purpose of illustration only and not as a definition of the limits of the invention.

In the drawing, wherein similar reference characters denote similar elements throughout the several views.

DETAILED DESCRIPTION OF A PREFERRED EMBODIMENT

Figure 1:
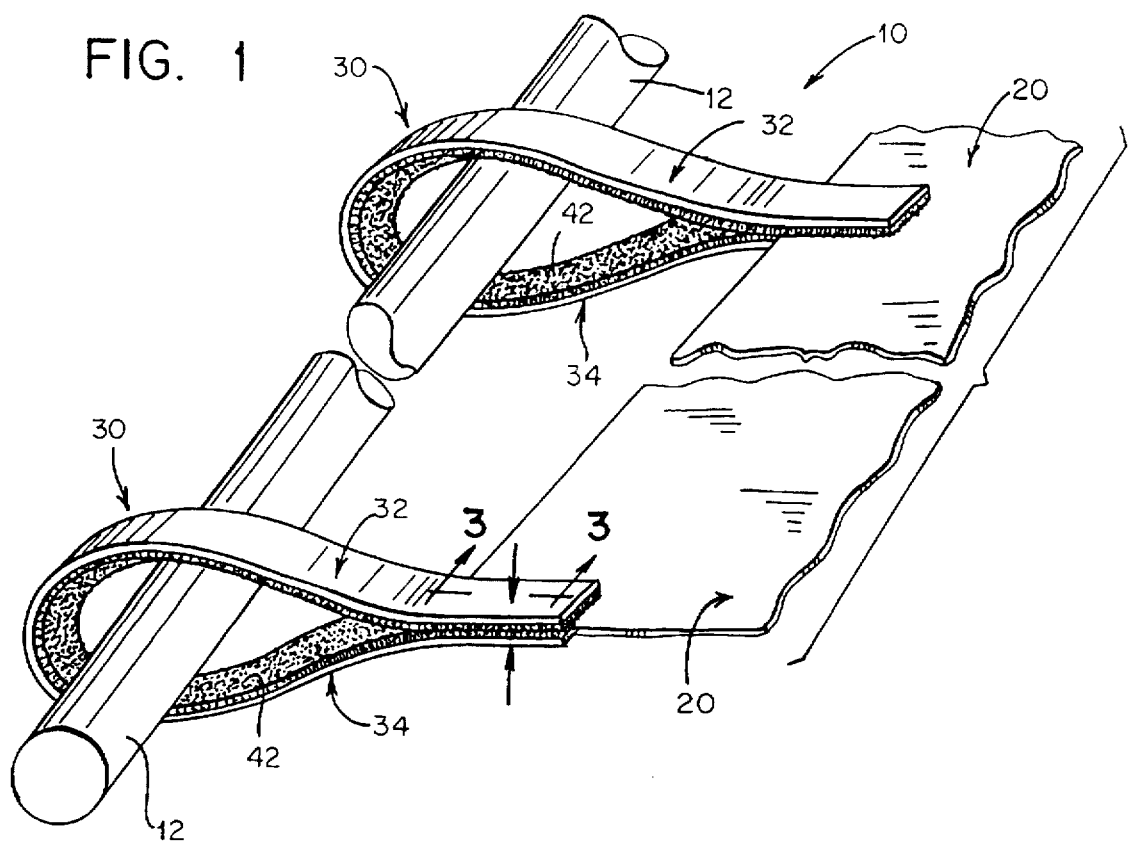
FIG. 1 is a fragmentally-illustrated perspective view of a temporary tarp-like barrier assembly embodying the present invention.

Turning now in detail to the drawing and in particular to FIG. 1, therein illustrated is a novel temporary tarp-like barrier assembly 10 embodying the present invention. Assembly 10 is readily supportable at a worksite for protection from the rain or wind and includes a plastic sheet 20 and a plurality of loops or hangers 30.

Specifically, plastic sheet 20 is held in place by hangers 30 which can be readily supported by a support structure such as a horizontally or vertically disposed pole or rod 12. In addition, according to the kit and method of the present invention a workman at a construction site can quickly attach hangers 30 to plastic sheet 20 to hang plastic sheet 20 on tubular scaffolding, building support beams, or other frame-like structures as described in greater detail below.

Figure 3:
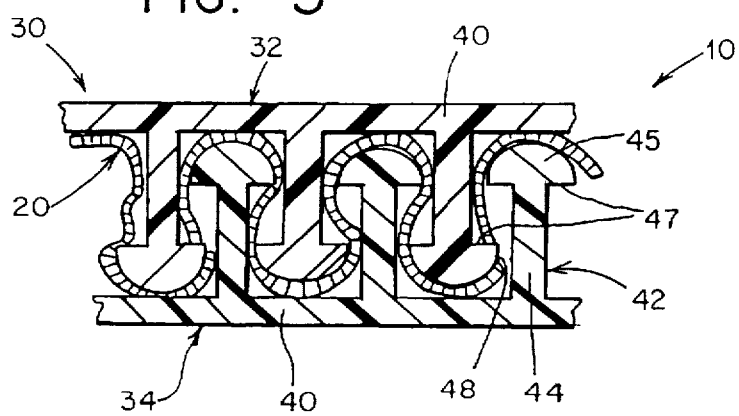
FIG. 3 is an enlarged sectional view taken along line 3—3 in FIG. 1.

Hangers 30 generally comprise strips of reclosable fasteners which are folded over so that a first portion or end 32 and a second portion or end 34 is disposed in overlapping relation and attached on opposite sides of plastic sheet 20. As used herein "reclosable fasteners" refers to DUAL LOCK (TM) reclosable fasteners manufactured and sold by the 3M Corporation of St. Paul, Minn., VELCRO (TM) type reclosable fasteners, and other reclosable fasteners which operate in a similar or comparable fashion. As best shown in FIG. 3, hangers 30 include a backing 40 from which outwardly extend a plurality of spaced-apart resilient mushroom-shaped mechanical interlocking members 42 having a shank 44 which attaches at an one end to backing 40 and having an opposite enlarged semi-spherically shaped or mushroom-like head or end 45.

As further illustrated in FIG. 3, plastic sheet 20 is attached to hangers 30 by plastic sheet 20 being sandwiched between mechanical interlocking members 42 of first and second portions 32 and 34. When viewed in cross-section plastic sheet 20 is disposed in a generally sinusoidal configuration.

Figure 2:
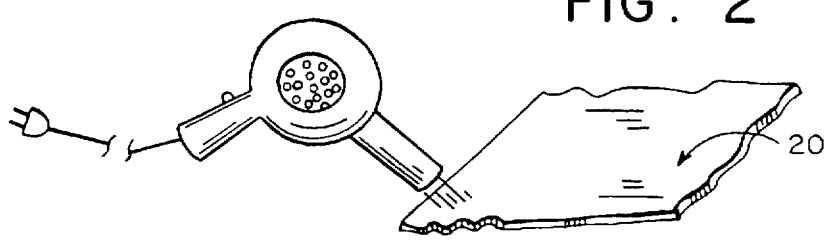
FIG. 2 is a schematic illustration of the plastic being heated prior to attachment to the loop-like hangers.

To more permanently attach hangers 30 to plastic sheet 20, a portion of plastic sheet 20 is heated, such as with a heat gun 14 as shown in FIG. 2, prior to attaching portions 32 and 34 of hangers 30 to the heated portion of plastic sheet 20. In particular, suitably heating plastic sheet 20 softens it and allows it to mold to mechanical interlocking members 42. When plastic sheet 20 cools, it solidifies and conforms to mechanical interlocking members 42 form a more permanent attachment to hanger 30.

Desirably, heating a portion of plastic sheet 20 allows mechanical interlocking members 42 to easily pierce or extend through plastic sheet 20 to more securely attach plastic sheet 20 to hanger 30. Specifically, as shown in FIG. 3, a portion 48 of semi-spherically shaped end 45 pierces or extends through a portion of plastic sheet 20 to better maintain hanger 30 to plastic sheet 20.

In addition, heating plastic sheet 20 allows respective opposite sides of plastic sheet 20 to bond to mechanical interlocking members 42, e.g., to backing 40, semi-spherically shaped end 45, and shank 44, to form a more unitary resulting structure. Preferably, plastic sheet 20 is fabricated from a flexible thermoplastic polymeric material such as styrene, acrylics, cellulosics, polyethylene, vinyls, nylons, fluorocarbons, etc., and advantageously, plastic sheet 20 and hangers 30 are fabricated from compatible thermoplastic materials so as to permit thermal bonding attachment to each other.

In operation, when one wants to erect a temporary tarp-like barrier using a kit comprising plastic sheet 20 and hangers 30 according to the present invention, one would place hanger 30 around a pole or rod 12, such as tubular scaffolding, and heat an edge portion of plastic sheet 20 (as illustrated in FIG. 2 with a heat gun). After the edge of plastic sheet 20 is heated, plastic sheet 20 is placed between opposite spaced-apart ends 32 and 34 of hanger 30. Mechanical interlocking members 42 of end 32 of hanger 30 is then contacted with a first surface of plastic sheet 20, and mechanical interlocking members 42 of end 34 of hanger 30 is contacted with a second surface of plastic sheet 20 so that ends 32 and 34 generally overlap each other. A compressive force is applied to end 32 and end 34 of hanger 30 (illustrated in FIG. 1 by arrows directed toward each other) to sandwich plastic sheet 20 between interlocking members 42 of hanger 30 and attach plastic sheet 20 to hanger 30. The steps are repeated for attaching additional hangers 30. Alternatively, the hangers can be attached to a plastic sheet and then inserted or slid onto a pole or support rod, or placed on and hung from a nail or hook.

While the present invention is disclosed with hangers fabricated from DUAL LOCK (TM) reclosable fasteners, from the present description it will be appreciated by those skilled in the art that other reclosable fasteners having mechanical interlocking members would also be suitable, e.g., reclosable fasteners having hook-and-loop interlocking members. In addition, from the present description, it will be appreciated by those skilled in the art that end 45 of mechanical interlocking members 42 can be configured to have other shapes, e.g., a conical shape, or a three- or four-sided pyramid shape, so as to provide a point or apex which more easily pierces through a plastic sheet.

Also from the present description, it will be appreciated by those skilled in the art that a plastic sheet can be supported from hangers which are attached to a plastic sheet which is folded over so that two layers thereof are sandwiched between the interlocking members of a hanger.

Thus, while several embodiments of the present invention has been shown and described, it is appreciated the from the present description that many changes and modifications may be made thereunto without departing from the spirit and scope of the invention.

What is claimed is:

1. A temporary tarp assembly comprising:
   a plastic sheet; and
   at least one reclosable fastener strip having a first end portion and a second end portion each respectively having a plurality of mechanical interlocking members, and wherein a portion of said plastic sheet is sandwiched and thermally molded between engaging portions of said interlocking members of said end portions of said at least one strip so that said strip forms a loop from which said plastic sheet is supportable.

2. The assembly according to claim 1, wherein said first and second end portions of said strip comprise a backing from which outwardly extend said mechanical interlocking members, and said mechanical interlocking members comprising a shank with an enlarged end.

3. The assembly according to claim 2, wherein said enlarged end is mushroom-shaped.

4. The assembly according to claim 1, wherein said plastic sheet is thermally bonded to said mechanical interlocking members.

5. The assembly according to claim 1, wherein said plastic sheet and said mechanical interlocking members are fabricated from compatible thermoplastic material.

6. The assembly according to claim 1, wherein at least a portion of said interlocking members extend through said plastic sheet.

7. A method for providing a temporary tarp, comprising the steps of:
   providing a plastic sheet;

providing at least one reclosable fastener strip having a first end portion and a second end portion each respectively having a plurality of interlocking members;

heating a portion of said plastic sheet;

contacting said interlocking members of said first end portion of said strip with a first surface of said heated portion of said plastic sheet;

contacting said interlocking members of said second end portion of said strip with an opposite surface of said heated portion of said plastic sheet so that said first and second end portions generally overlap each other and so that said strip forms a loop; and applying a force to said first and second end portions of said strip to sandwich said plastic sheet between said interlocking members of said strip to thermally mold and attach said strip to said plastic sheet.

8. The method according to claim 7, wherein said strip comprises a backing from which outwardly extends said mechanical interlocking members, and said mechanical interlocking members comprising a shank with an enlarged end.

9. The method according to claim 8, wherein said enlarged end is mushroom-shaped.

10. The method according to claim 7, wherein said plastic sheet is thermally bonded to said mechanical interlocking members.

11. The method according to claim 7, wherein said plastic sheet and said interlocking members are fabricated from compatible thermoplastic materials.

* * * * *